United States Patent
Huang et al.

(10) Patent No.: US 9,947,288 B2
(45) Date of Patent: Apr. 17, 2018

(54) DISPLAY DEVICE, DISPLAY DRIVING METHOD AND DISPLAY SYSTEM

(71) Applicants: Boe Technology Group Co., Ltd., Beijing (CN); Beijing Boe Optoelectronics Technology Co., Ltd., Beijing (CN)

(72) Inventors: Haiqin Huang, Beijing (CN); Junwei Wang, Beijing (CN); Haifeng Yu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 32 days.

(21) Appl. No.: 14/912,108

(22) PCT Filed: Aug. 14, 2015

(86) PCT No.: PCT/CN2015/086981
§ 371 (c)(1),
(2) Date: Feb. 15, 2016

(87) PCT Pub. No.: WO2016/169161
PCT Pub. Date: Oct. 27, 2016

(65) Prior Publication Data
US 2017/0061921 A1 Mar. 2, 2017

(30) Foreign Application Priority Data
Apr. 24, 2015 (CN) .......................... 2015 1 0202159

(51) Int. Cl.
*G09G 5/02* (2006.01)
*G09G 5/00* (2006.01)
(Continued)

(52) U.S. Cl.
CPC .............. *G09G 5/003* (2013.01); *G09G 3/001* (2013.01); *G09G 5/38* (2013.01); *G02B 27/26* (2013.01);
(Continued)

(58) Field of Classification Search
CPC .. G02B 5/3016; G02B 5/3025; G02B 5/3083; G02B 27/00; G02B 27/22;
(Continued)

(56) References Cited

U.S. PATENT DOCUMENTS 6,271,896 B2 * 8/2001 Moseley ............ H04N 13/0477
348/51
6,603,504 B1 * 8/2003 Son ..................... H04N 13/0404
348/54
(Continued)

FOREIGN PATENT DOCUMENTS

| CN | 102360136 | 2/2012 |
| CN | 102625131 | 8/2012 |

(Continued)

OTHER PUBLICATIONS

Office Action from China Application No. 201510202159.6 dated Jan. 5, 2017.
(Continued)

*Primary Examiner* — Joe H Cheng
(74) *Attorney, Agent, or Firm* — Calfee, Halter & Griswold LLP

(57) ABSTRACT

The present disclosure provides a display device, a display driving method and a display system, wherein the display device includes a display panel and a polarizer disposed on the light outgoing side of the display panel. The polarizer comprises a first polarizing region and a second polarizing region having different polarizing directions from each other. The display device further includes an image proces-
(Continued)

sor configured to cause only a region of the display panel corresponding to the first polarizing region to display an image to be displayed if a first anti-peep mode is selected by a user; and to cause only a region of the display panel corresponding to the second polarizing region to display the image to be displayed if a second anti-peep mode is selected by a user. The display device according to the present disclosure has a significantly improved applicability.

12 Claims, 5 Drawing Sheets

(51) Int. Cl.
    *G09G 5/38* (2006.01)
    *G09G 3/00* (2006.01)
    *G02B 27/26* (2006.01)

(52) U.S. Cl.
    CPC ............... *G09G 2320/0606* (2013.01); *G09G 2320/0686* (2013.01); *G09G 2354/00* (2013.01); *G09G 2358/00* (2013.01)

(58) Field of Classification Search
    CPC ............ G02B 27/2214; G02B 27/2228; G02B 27/26; G02B 27/28; G02B 27/286; G09G 5/003; G09G 5/38; G09G 2300/0447; G09G 2320/0606; G09G 2320/0686; G02F 1/1323; G02F 1/133528; G02F 1/133531; G02F 1/133538; G02F 1/13362; G02F 1/29; H04N 13/0409; H04N 13/0452; H04N 13/0454; H04N 13/0456

See application file for complete search history.

(56) References Cited

U.S. PATENT DOCUMENTS

| | | | | |
|---|---|---|---|---|
| 8,474,980 | B2* | 7/2013 | Hsu | G02B 27/26 353/20 |
| 9,329,430 | B2* | 5/2016 | Erinjippurath | G02F 1/133536 |
| 2002/0001128 | A1* | 1/2002 | Moseley | G02B 5/3016 359/465 |
| 2004/0135740 | A1* | 7/2004 | Sato | G02B 27/26 345/6 |
| 2005/0243265 | A1* | 11/2005 | Winlow | G02F 1/1323 349/178 |
| 2006/0082702 | A1* | 4/2006 | Jacobs | G02B 5/3083 349/96 |
| 2006/0126156 | A1 | 6/2006 | Evans et al. | |
| 2010/0033557 | A1* | 2/2010 | Abe | G02B 27/26 348/58 |
| 2010/0238097 | A1* | 9/2010 | Baik | G02B 27/26 345/87 |
| 2010/0265230 | A1* | 10/2010 | Kang | G09G 3/003 345/211 |
| 2010/0289884 | A1* | 11/2010 | Kang | G02B 27/2228 348/58 |
| 2011/0122239 | A1* | 5/2011 | Baik | G09G 3/003 348/58 |
| 2012/0056914 | A1* | 3/2012 | Gass | G02F 1/134363 345/690 |
| 2013/0103943 | A1* | 4/2013 | Hirsch | G09C 5/00 713/168 |
| 2013/0135293 | A1* | 5/2013 | Kim | G09G 3/003 345/419 |
| 2013/0169765 | A1* | 7/2013 | Park | H04N 13/04 348/54 |
| 2014/0028815 | A1* | 1/2014 | Atkins | H04N 13/0434 348/58 |
| 2014/0293172 | A1* | 10/2014 | Suzuki | G02B 27/2214 349/15 |
| 2016/0011450 | A1* | 1/2016 | Li | G02F 1/13363 345/4 |
| 2016/0071490 | A1* | 3/2016 | Jeong | G06F 3/147 345/1.3 |

FOREIGN PATENT DOCUMENTS

| | | |
|---|---|---|
| CN | 102625131 A * | 8/2012 |
| CN | 102651819 | 8/2012 |
| CN | 103009740 | 4/2013 |
| CN | 104536220 | 4/2015 |
| CN | 104751768 | 7/2015 |
| JP | 2009169148 | 7/2009 |

OTHER PUBLICATIONS

International Search Report and Written Opinion from PCT/CN15/86981 dated Dec. 31, 2015.

Office action from Chinese Application No. 201510202159.6 dated Jun. 8, 2016.

Office action from Chinese Application No. 201510202159.6 dated Mar. 16, 2016.

\* cited by examiner

DISPLAY DEVICE, DISPLAY DRIVING METHOD AND DISPLAY SYSTEM

RELATED APPLICATIONS

The present application is the U.S. national phase entry of PCT/CN2015/086981 with an International filing date of Aug. 14, 2015, which claims the benefit of Chinese Application No. 201510202159.6, filed Apr. 24, 2015, the entire disclosures of which are incorporated herein by reference.

TECHNICAL FIELD

The present disclosure relates to the display technical field, and in particular, to a display device, a display driving method and a display system.

BACKGROUND

Currently, conventional anti-peep display devices utilize the light shielding principle of raster light blocking walls in which displayed content may be seen within a certain range of visible angles that have been fixed during the process of manufacture and cannot be seen out of the range of visible angles due to the light blocking of the raster light blocking walls.

For example, an existing anti-peep display device as shown in FIG. 1 includes a display panel 1 and raster light blocking walls 2 fixed on the display panel 1 wherein the raster light blocking walls 2 are perpendicular to the display panel 1. It may be known from the arrangement of the raster light blocking walls 2 in FIG. 1 that a region between sightlines a and b is a visible region in which content displayed on the display device may be seen clearly. Further, a region on the left of the sightline a and a region on the right of the sightline b are non-visible regions in which the content displayed on the display device cannot be seen clearly or at all.

The above-described anti-peep display device has the following disadvantages: since the raster light blocking walls 2 are fixed on the display panel 1, the angle between each of the raster light blocking walls 2 and the display panel 1 is restricted (i.e. the light blocking angle of each of the raster light blocking walls 2 is restricted), and the visible angle range and non-visible angle range of the anti-peep display device are thus restricted. Therefore, the applicability of the anti-peep display device is lower.

SUMMARY

An object of the present disclosure is to provide an anti-peep display device with a higher applicability.

In a first aspect, the present disclosure provides a display device including a display panel and a polarizer disposed on the light outgoing side of the display panel. The polarizer includes a first polarizing region and a second polarizing region having different polarizing directions from each other. The display device further includes an image processor configured to cause only a region of the display panel corresponding to the first polarizing region to display an image to be displayed if a first anti-peep mode is selected by a user; and to cause only a region of the display panel corresponding to the second polarizing region to display the image to be displayed if a second anti-peep mode is selected by the user. It should be noted that the term "image to be displayed" as used herein refers to an image that should be displayed to a respective viewer.

Optionally, the image processor is further configured to cause the region of the display panel corresponding to the second polarizing region to display an interfering image if the first anti-peep mode is selected by the user. Alternatively, the image processor may be further configured to cause the region of the display panel corresponding to the first polarizing region to display the interfering image if the second anti-peep mode is selected by the user.

Optionally, the image processor is further configured to cause the region of the display panel corresponding to the first polarizing region to display a first image to be displayed and cause the region of the display panel corresponding to the second polarizing region to display a second image to be displayed, if a double viewing mode is selected by the user.

Optionally, the first polarizing region may correspond to odd rows of pixels of the display panel in position, and the second polarizing region corresponds to even rows of pixels of the display panel in position.

Optionally, the polarizer may further include a further polarizing region having a polarizing direction different from the polarizing directions of the first and second polarizing regions; and the image processor may be further configured to cause only a region of the display panel corresponding to the further polarizing region to display an image to be displayed if a further anti-peep mode is selected by the user.

The present disclosure further provides a display driving method for driving the display device as described above, the method including:

causing only a region of the display panel of the display device corresponding to the first polarizing region to display an image to be displayed if a first anti-peep mode is selected by a user; and causing only a region of the display panel corresponding to the second polarizing region to display the image to be displayed if a second anti-peep mode is selected by a user.

Optionally, the method further includes:

causing the region of the display panel corresponding to the second polarizing region to display an interfering image if the first anti-peep mode is selected by the user; or causing the region of the display panel corresponding to the first polarizing region to display the interfering image if the second anti-peep mode is selected by the user.

Optionally, the method further includes:

causing the region of the display panel corresponding to the first polarizing region to display a first image to be displayed and causing the region of the display panel corresponding to the second polarizing region to display a second image to be displayed, if a double viewing mode is selected by the user.

Optionally, the first polarizing region corresponds to odd rows of pixels of the display panel in position, and the second polarizing region corresponds to even rows of pixels of the display panel in position.

The present disclosure further provides a display system including any of the display devices as described above and includes first light polarizing glasses and second light polarizing glasses. The left and right lenses of the first light polarizing glasses may both have a light polarizing direction consistent with polarizing direction of the first polarizing region. Further, the left and right lenses of the second light polarizing glasses may both have a light polarizing direction consistent with polarizing direction of the second polarizing region.

In the display device provided by the present disclosure, the polarizer having first and second polarizing regions may be attached to the display panel, and the first polarizing region may have a different polarizing direction from the second polarizing region. As such, it is impossible for a viewer not wearing glasses having a polarizing direction consistent with the polarizing direction of the first (or second) polarizing region to see an image displayed at a position of the display panel corresponding to the first (or second) polarizing region regardless of the viewer's position relative to the display device, and it is possible for a viewer wearing glasses having a polarizing direction consistent with the polarizing direction of the first (or second) polarizing region to see the image displayed at the position of the display panel corresponding to the first (or second) polarizing region regardless of the viewer's position relative to the display device, without restriction on visible and non-visible angle ranges as the anti-peep display devices in the prior art. As compared to the display device in the prior art in which the visible angle range and non-visible angle range are restricted, the display device provided by the present disclosure has a significantly improved applicability.

DESCRIPTION OF EMBODIMENTS

In order to make the objective, technical solutions and advantages of the present disclosure clearer, embodiments of the present disclosure will be described clearly and fully in combination with drawings according to the embodiments of the present disclosure. Obviously, the described embodiments are just a part of the embodiments of the present disclosure, and not all the embodiments. Based on the embodiments of the present disclosure, additional embodiments obtained by those of ordinary skills in the art without doing any inventive effort will fall within the scope of the present disclosure.

In some embodiments, the display device may include a display panel 1 and a polarizer 3 located on the light outgoing side of the display panel, as shown in FIGS. 2(a)-2(d). Although the polarizer 3 is shown as being separate from the display panel 1 in FIGS. 2(a)-2(d), the polarizer 3 may be integrated with the display panel 1 in other embodiments according to the present disclosure.

Figure 2A:
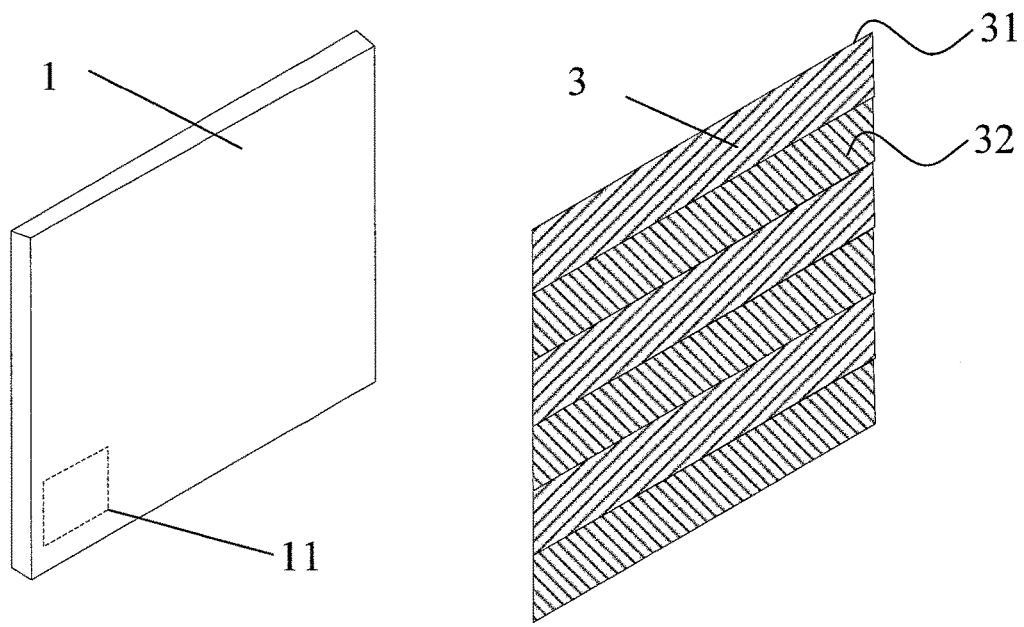
FIG. 2(a)-2(d) are schematic structural diagrams of parts of a display device according to embodiments of the present disclosure respectively.
Figure 2B:
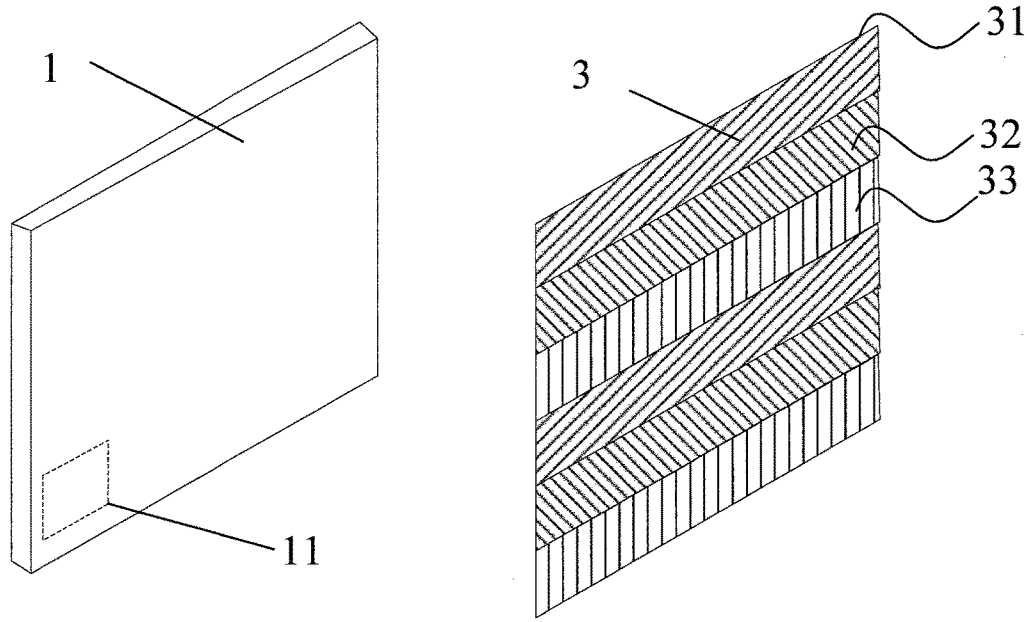
Figure 2C:
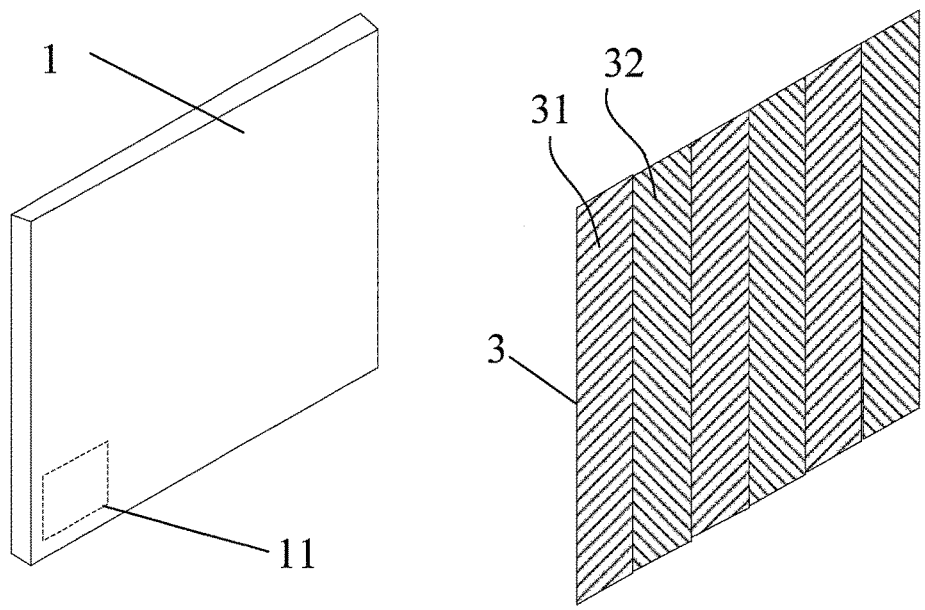
Figure 2D:
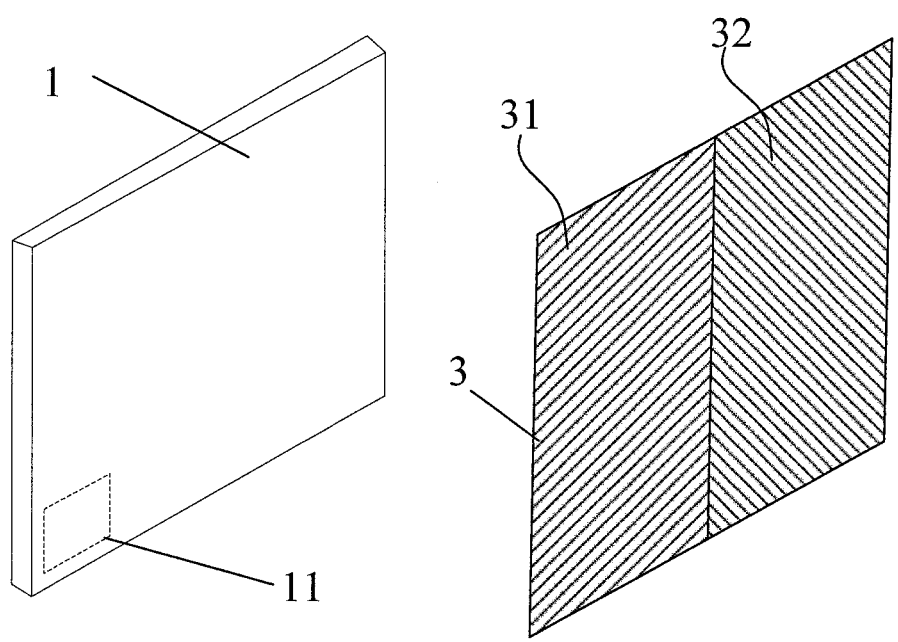

As shown in FIG. 2(a), the polarizer 3 includes one or more first polarizing regions 31 and one or more second polarizing regions 32, and the polarizing direction of the first polarizing regions 31 is different from (e.g., perpendicular to, as shown in FIG. 2(a) the polarizing direction of the second polarizing regions 31. In another embodiment, the polarizer 3 may include only the first polarizing regions 31 or only the second polarizing regions 32. In yet another embodiment, the polarizer 3 may include one or more third polarizing regions, one or more fourth polarizing regions, etc. in addition to the first polarizing regions 31 and the second polarizing regions 32, wherein the first, second, third and fourth polarizing regions have different polarizing directions from each other.

The display device according to an embodiment of the present disclosure further includes an image processor 11 configured to cause the display panel to display based on a user setting an image to be displayed which corresponds to an arrangement of the polarizer. For example, in the embodiment as shown in FIG. 2(a), the image processor 11 may be configured to cause only a region of the display panel 1 corresponding to the first polarizing regions 31 to display an image to be displayed if a first anti-peep mode is selected by a user; and to cause only a region of the display panel 1 corresponding to the second polarizing regions 32 to display the image to be displayed if a second anti-peep mode is selected by the user.

In the display device according to the present disclosure, a polarizer is attached to the display panel, and the polarizer may include, for example, a first polarizing region and a second polarizing region having different polarizing directions from each other. In this case, if a viewer wants to see or discern content displayed on the display panel, he or she needs to wear polarizing glasses having a polarizing direction consistent with the polarizing direction of a respective polarizing region of the polarizer. As such, it is impossible for those viewers not wearing any polarizing glasses or those viewers wearing polarizing glasses having a polarizing direction not consistent with the polarizing direction of a respective polarizing region of the polarizer to see or discern the content displayed on the display panel, such that an effect of preventing such viewers from peeping the content displayed on the display panel is achieved.

Figure 1:
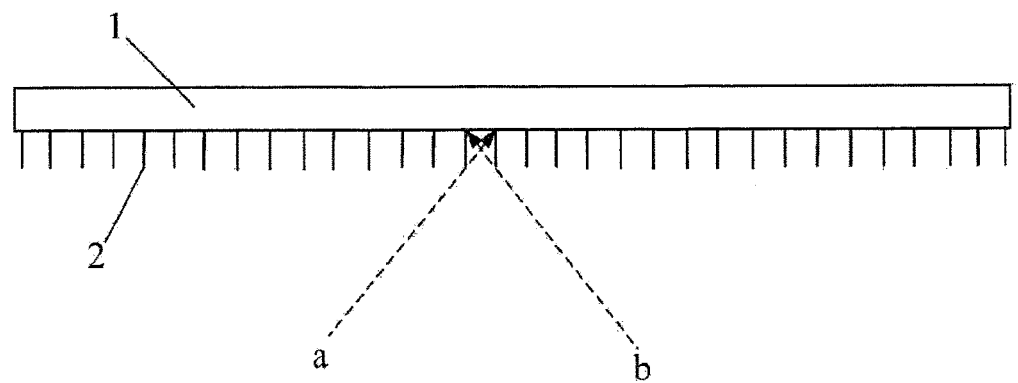
FIG. 1 is a schematic structural diagram of an anti-peep display device in the prior art.

Furthermore, as an example, in the embodiment as shown in FIG. 2(a), it is impossible for a viewer not wearing glasses having a polarizing direction consistent with the polarizing direction of the first (or second) polarizing region to see the image displayed at a region of the display panel corresponding to the first (or second) polarizing region regardless of the viewer's position relative to the display device, and it is possible for a viewer wearing glasses having a polarizing direction consistent with the polarizing direction of the first (or second) polarizing region to see the image displayed at the region of the display panel corresponding to the first (or second) polarizing region regardless of the viewer's position relative to the display device, without restriction on visible and non-visible angle ranges of the display device in the prior art as shown in FIG. 1. As compared to display devices in the prior art in which visible angle range and non-visible angle range are restricted, the display device according to the present disclosure has obviously a significantly improved flexibility. In some embodiments, the first polarizing region herein may correspond to odd rows of pixels of the display panel in position, and the second polarizing region may correspond to even rows of pixels of the display panel in position. The advantage of doing so is that images displayed by the first polarizing regions 31 and the second polarizing regions 32 will be sufficiently mixed in a double viewing mode or an anti-peep mode in which an interfering image is played. In this case, a viewer not wearing respective polarizing glasses will see a completely disordered image, such that the anti-peep effect is enhanced.

In other embodiments, other relationship between the first and second polarizing regions and the display panel is also possible. As an example, the position of the first polarizing region 31 may correspond to the position of an odd column of pixels in the display panel, and the position of the second polarizing region 32 may correspond to the position of an even column of pixels in the display panel. As another example, the first polarizing region 31 may correspond to the left part of the display panel as a whole (i.e. it is the entire left part of the polarizer), and the second polarizing region 32 corresponds to the right part of the display panel as a whole (i.e. it is the entire right part of the polarizer), such that the basic problems proposed by the present disclosure may also be solved. It is appreciated that implementation of the present disclosure is not affected by specific shapes of and positional relationship between the first polarizing region 31 and the second polarizing region 32, and that other similar technical solutions should also fall within the scope of the present disclosure.

In some implementations, the above-described image processor may be interpreted as an image processor present in the prior art, such as a processor that processes images and communicates with a light emitting control. However, in contrast to the prior art, the above-described image processor in the embodiments of the present disclosure may make a differentiated display in respective regions of the display panel based on the display mode (e.g., the first anti-peep mode, the second anti-peep mode, the double viewing mode) selected by the user.

In some implementations, the image processor herein may determine whether the first anti-peep mode, the second anti-peep mode, or the double viewing mode is currently selected by the user, by directly or indirectly acquiring an instruction inputted by the user for selecting the anti-peep or double viewing modes.

Figure 3:
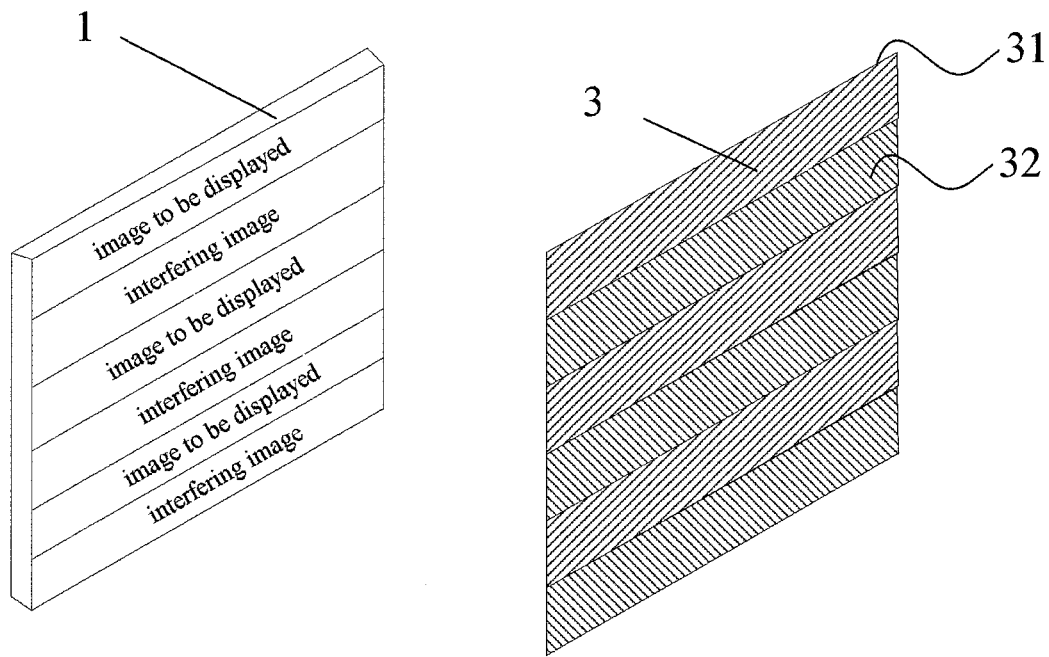
FIG. 3 is a schematic diagram of a display device in an anti-peep mode according to an embodiment of the present disclosure.

In some implementations, such as implementations utilizing an embodiment as shown in FIG. 3, the image processor may be configured to cause the region of the display panel corresponding to the second polarizing region 32 to display an interfering image while causing the region of the display panel 1 corresponding to the first polarizing region 31 to display the image to be displayed if the first anti-peep mode is selected by the user.

In another embodiment, the image processor herein may be further configured to cause the region of the display panel corresponding to the first polarizing region 31 to display the interfering image while causing the region of the display panel 1 corresponding to the second polarizing region 32 to display the image to be displayed if the second anti-peep mode is selected by the user.

The advantage of doing so is that, as compared to displaying only the image to be displayed, displaying the image to be displayed and the interfering image together increases the total ambiguity of the images displayed by the display panel, and thus increases the anti-peep ability of the display device. In some implementations, the interfering image herein may be, for example, a predetermined picture.

Figure 4:
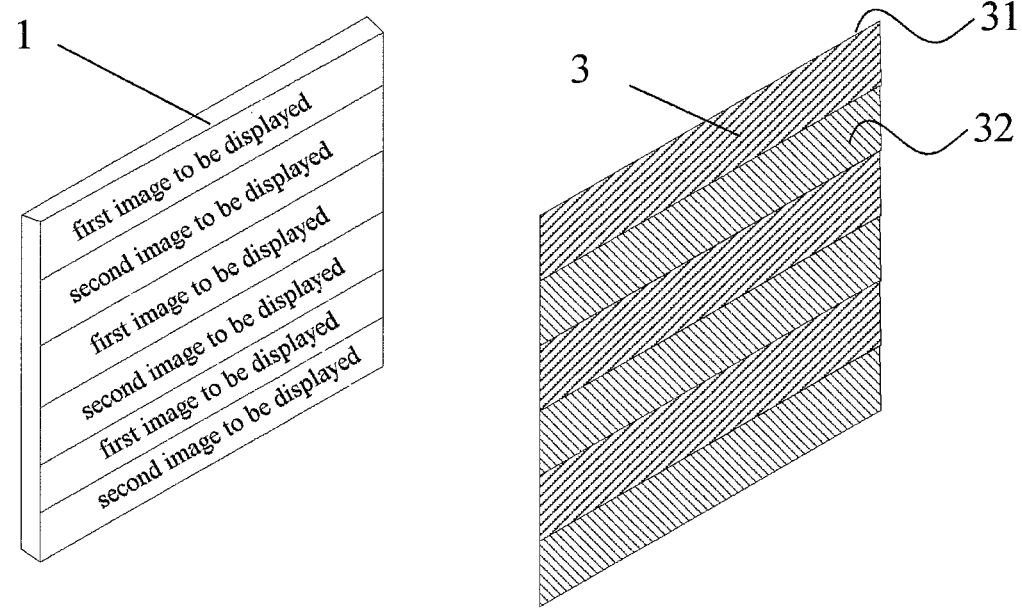
FIG. 4 is a schematic diagram of a display device in a double viewing mode according to an embodiment of the present disclosure.

In some implementations, as shown in FIG. 4, the above-described image processor may be further configured to cause the region of the display panel corresponding to the first polarizing region 31 to display a first image to be displayed and cause the region of the display panel corresponding to the second polarizing region 32 to display a second image to be displayed, if the double viewing mode is selected by the user.

In this way, viewers wearing glasses having a polarizing direction consistent with the polarizing direction of the first polarizing region is enabled to view the first image to be displayed, and viewers wearing glasses having a polarizing direction consistent with the polarizing direction of the second polarizing region is enabled to view the second image to be displayed. Thus the double viewing function of the display device is achieved while the anti-peep function of the display device is additionally achieved.

Based on the same concept, the present disclosure further provides a display driving method which may be used to drive the display device according to the present disclosure, particularly a display panel of the display device which has a polarizer attached on its light outgoing side. The polarizer includes e.g. a first polarizing region and a second polarizing region having different polarizing directions from each other, and the method includes:

causing only a region of the display panel corresponding to the first polarizing region to display an image to be displayed if a first anti-peep mode is selected by a user; and causing only a region of the display panel corresponding to the second polarizing region to display the image to be displayed if a second anti-peep mode is selected by a user.

With the display driving method according to embodiments of the present disclosure, it is impossible for a viewer not wearing glasses having a polarizing direction consistent with the polarizing direction of the first (or second) polarizing region to see the image displayed at a position of the display panel corresponding to the first (or second) polarizing region regardless of the viewer's position relative to the display device, and it is possible for a viewer wearing glasses having a polarizing direction consistent with the polarizing direction of the first (or second) polarizing region to see the image displayed at the position of the display panel corresponding to the first (or second) polarizing region regardless of the viewer's position relative to the display device, without restriction on visible and non-visible ranges. As compared to the display driving method in the prior art in which the visible range and non-visible range are restricted, the display driving method according to the present disclosure has a significantly improved flexibility.

In implementation, the method may further includes: causing the region of the display panel corresponding to the second polarizing region to display an interfering image while causing the region of the display panel corresponding to the first polarizing region to display the image to be displayed, if the first anti-peep mode is selected by the user; and causing the region of the display panel corresponding to the first polarizing region to display the interfering image while causing the region of the display panel corresponding to the second polarizing region to display the image to be displayed, if the second anti-peep mode is selected by the user.

In implementation, the method may further includes: causing the region of the display panel corresponding to the first polarizing region to display a first image to be displayed and causing the region of the display panel corresponding to the second polarizing region to display a second image to be displayed, if a double viewing mode is selected by the user.

In implementation, the position of the first polarizing region corresponds to the position of an odd row of pixels in the display panel, and the position of the second polarizing region corresponds to the position of an even row of pixels in the display panel.

Figure 5:
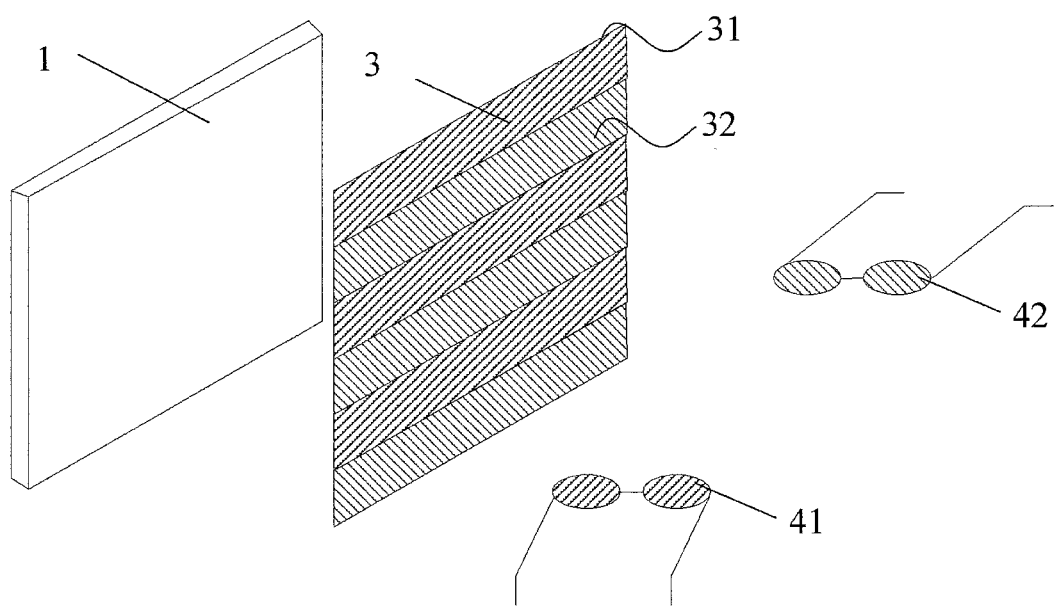
FIG. 5 is a schematic diagram of a display system according to an embodiment of the present disclosure.

As shown in FIG. 5, the present disclosure further provides a display system comprising the display device according to the present disclosure that includes a display panel 1 and a polarizer 3; the display system further includes a first light polarizing glasses 41 and a second light polarizing glasses 42;

left and right lenses in the first light polarizing glasses 41 both have a light polarizing direction consistent with the polarizing direction of the first polarizing region; and left and right lenses in the second light polarizing glasses 42 both have a light polarizing direction consistent with the polarizing direction of the second polarizing region.

In the display system according to the present disclosure, as both of the left and right lenses in the first light polarizing glasses 41 have a light polarizing direction consistent with the polarizing direction of the first polarizing region, it is possible for a viewer wearing the first light polarizing glasses 41 to see the image displayed at the position of the display panel corresponding to the first polarizing region regardless of the viewer's position relative to the display device. In contrast, it is impossible for a viewer not wearing the first light polarizing glasses 41 to see the image displayed at the position of the display panel corresponding to the first polarizing region regardless of the viewer's position relative to the display device. Likewise, a viewer wearing the second light polarizing glasses 42 can see the image displayed at the position of the display panel corresponding to the second polarizing region regardless of the viewer's position, and a viewer not wearing the second light polarizing glasses 42 cannot see the image displayed at the position of the display panel corresponding to the second polarizing region regardless of the viewer's position relative to the display device. As compared to the display system in the art in which the visible angle range and non-visible range are restricted, the display system according to the present disclosure has a significantly improved flexibility.

It is to be noted that although the above description only illustrates embodiments in which the polarizer includes a first and a second polarizing regions, a situation where the polarizer includes only one polarizing region or more than two polarizing regions will be readily conceived by persons skilled in the art without departing from the scope claimed by the subject matter of the present disclosure. For example, in the case that the polarizer includes three polarizing regions, the display panel of the display device may be enabled to display an image for the three polarizing regions respectively, and the image processor of the display device may include three anti-peep modes and one triple viewing mode. Among others, the image processor may be configured to cause only a region of the display panel corresponding to a first polarizing region (e.g. represented by the reference sign 31 in FIG. 2(*b*)) to display an image to be displayed if a first anti-peep mode is selected by a user; to cause only a region of the display panel corresponding to a second polarizing region (e.g. represented by the reference sign 32 in FIG. 2(*b*)) to display the image to be displayed if a second anti-peep mode is selected by the user; to cause only a region of the display panel corresponding to a third polarizing region (e.g. represented by the reference sign 33 in FIG. 2(*b*)) to display the image to be displayed if a third anti-peep mode is selected by the user; and to cause the regions of the display panel corresponding to the first, second and third polarizing regions to display different images to be displayed so as to achieve a triple viewing function, if a triple viewing mode is selected by the user.

The foregoing description only illustrates specific embodiments of the present disclosure and the scope of the present disclosure is not limited thereto. Variations or alternatives that may be readily conceived by any of the persons skilled in the art from the techniques disclosed by the present disclosure should all fall within the scope of the present disclosure. Accordingly, the scope of the present disclosure should be only limited by the scope of the claims.

The invention claimed is:

1. A display device comprising:
a display panel;
a polarizer disposed on the light outgoing side of the display panel, the polarizer comprises a first polarizing region and a second polarizing region having different polarizing directions from each other;
and an image processor configured to cause only a region of the display panel corresponding to the first polarizing region to display an image to be displayed if a first anti-peep mode is selected by a user; and further configured to cause only a region of the display panel corresponding to the second polarizing region to display the image to be displayed if a second anti-peep mode is selected by the user;
wherein the image processor is further configured to cause the region of the display panel corresponding to the first polarizing region to display a first image to be displayed and cause the region of the display panel corresponding to the second polarizing region to display a second image to be displayed, if a double viewing mode is selected by the user, wherein the first image to be displayed and the second image to be displayed are not interfering images and both images that should be displayed to respective viewers.

2. The display device of claim 1, wherein the image processor is further configured to cause the region of the display panel corresponding to the second polarizing region to display an interfering image if the first anti-peep mode is selected by the user; or the image processor is further configured to cause the region of the display panel corresponding to the first polarizing region to display the interfering image if the second anti-peep mode is selected by the user.

3. The display device of claim 1, wherein the first polarizing region corresponds to odd rows of pixels of the display panel in position, and the second polarizing region corresponds to even rows of pixels of the display panel in position.

4. The display device of claim 1, wherein the first polarizing region corresponds to odd columns of pixels of the display panel in position, and the second polarizing region corresponds to even columns of pixels of the display panel in position.

5. The display device of claim 1, wherein the first polarizing region comprises the left part of the polarizer and the second polarizing region comprises the right part of the polarizer.

6. The display device of claim 1, wherein the polarizer further comprises a further polarizing region having a polarizing direction different from the polarizing directions of the first and second polarizing regions; and wherein the image processor is further configured to cause only a region of the display panel corresponding to the further polarizing region to display the image to be displayed if a further anti-peep mode is selected by the user.

7. A display driving method for driving the display device of claim 1 comprising
causing only a region of the display panel of the display device corresponding to the first polarizing region to display an image to be displayed if a first anti-peep mode is selected by a user;
causing only a region of the display panel corresponding to the second polarizing region to display the image to be displayed if a second anti-peep mode is selected by the user; and causing the region of the display panel corresponding to the first polarizing region to display a first image to be displayed and causing the region of the display panel corresponding to the second polarizing region to display a second image to be displayed, if a double viewing mode is selected by the use, wherein the first image to be displayed and the second image to be displayed are not interfering images and both images that should be displayed to respective viewers.

8. The method of claim 7, wherein the method further comprises:
   causing the region of the display panel corresponding to the second polarizing region to display an interfering image if the first anti-peep mode is selected by the user; or
   causing the region of the display panel corresponding to the first polarizing region to display the interfering image if the second anti-peep mode is selected by the user.

9. The method of claim 7, wherein the first polarizing region corresponds to odd rows of pixels of the display panel in position, and the second polarizing region corresponds to even rows of pixels of the display panel in position.

10. The method of claim 7, wherein the first polarizing region corresponds to odd columns of pixels of the display panel in position, and the second polarizing region corresponds to even columns of pixels of the display panel in position.

11. The method of claim 7, wherein the first polarizing region comprises the left part of the polarizer and the second polarizing region comprises the right part of the polarizer.

12. A display system comprising the display device of claim 1 and a first light polarizing glasses and a second light polarizing glasses;
   wherein left and right lenses in the first light polarizing glasses both have a light polarizing direction consistent with the polarizing direction of the first polarizing region; and
   left and right lenses in the second light polarizing glasses both have a light polarizing direction consistent with the polarizing direction of the second polarizing region.

* * * * *